INVENTOR.
NICHOLAS CURTIS

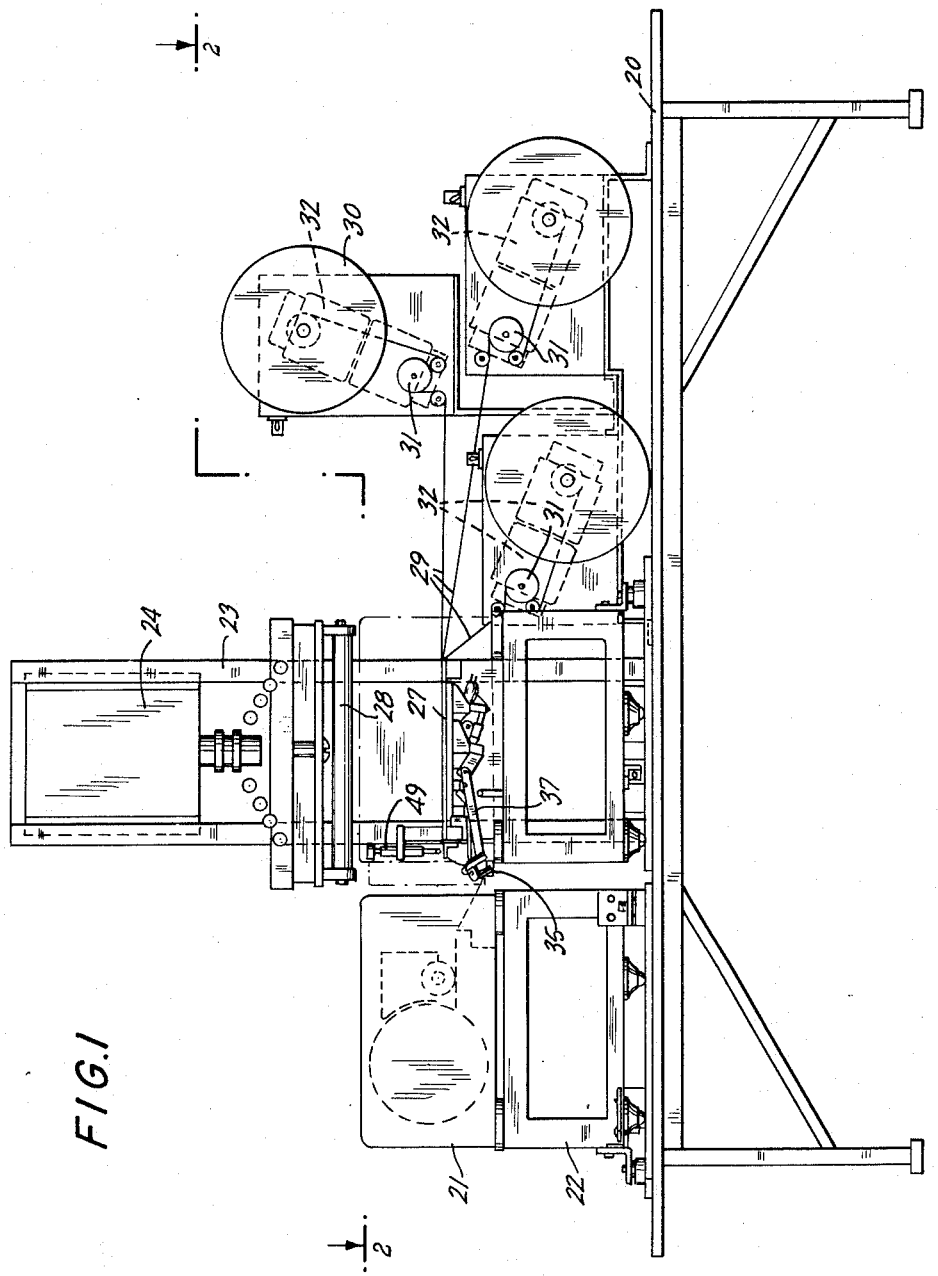

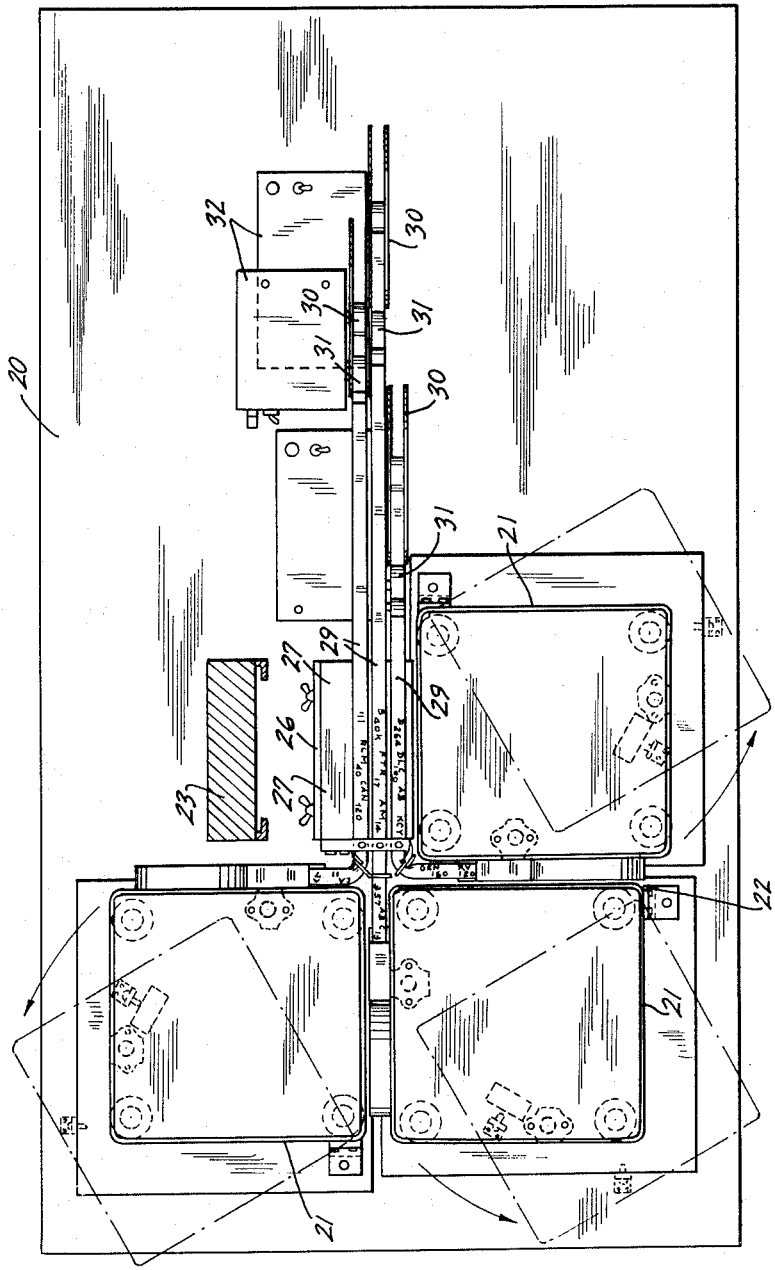

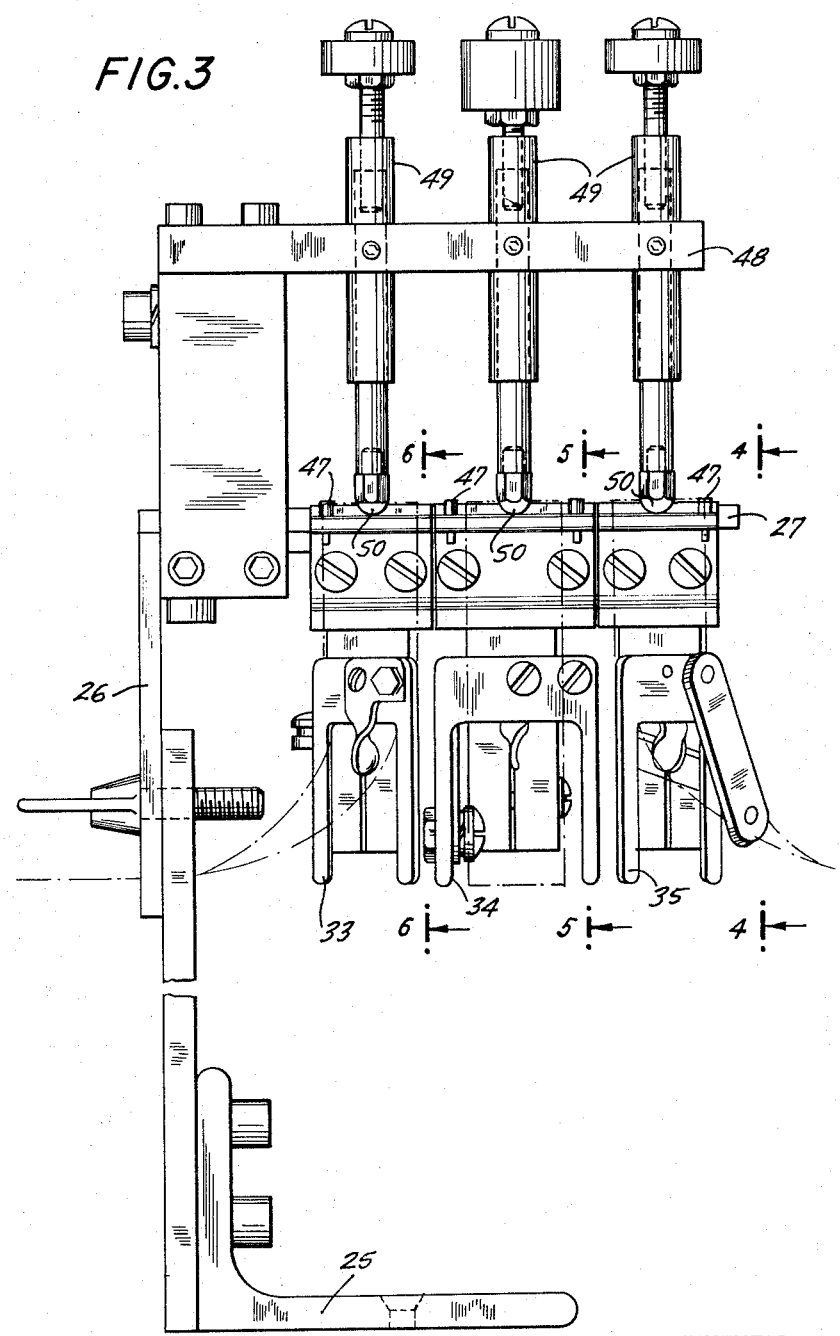

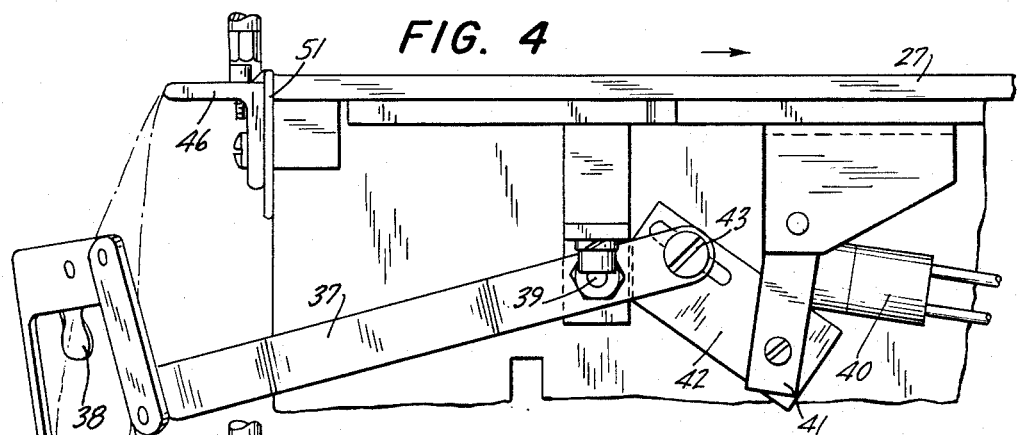
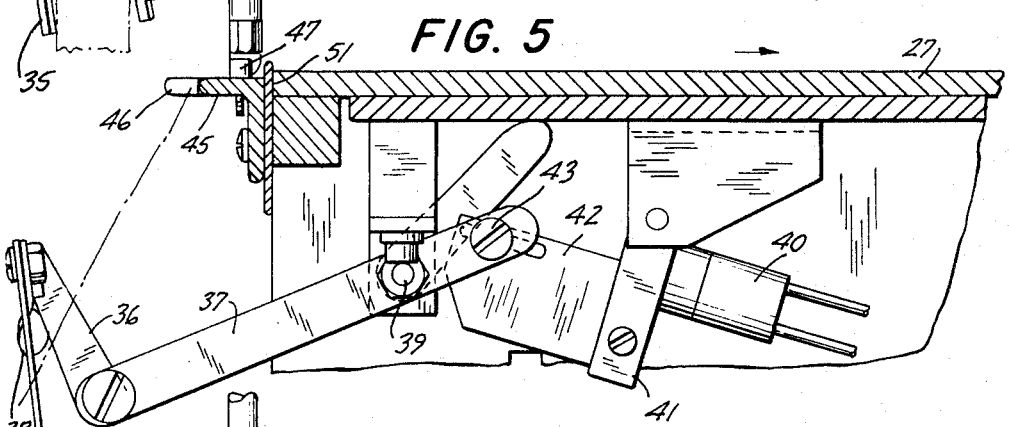
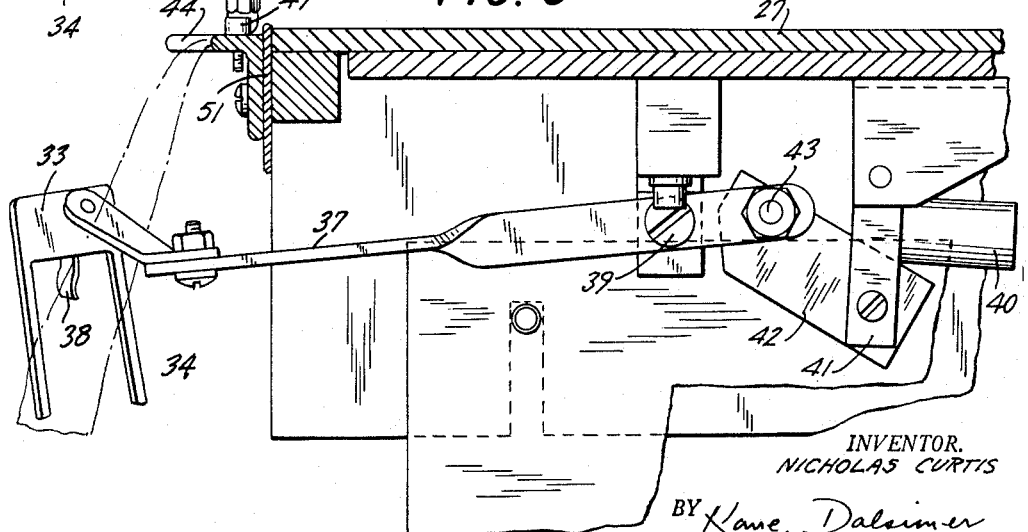

Oct. 10, 1961 N. CURTIS 3,004,102
DATA-REPRODUCING APPARATUS
Filed Oct. 23, 1959 6 Sheets-Sheet 6

INVENTOR.
NICHOLAS CURTIS
BY Kane, Dalsimer
and Kane
ATTORNEYS

United States Patent Office 3,004,102
Patented Oct. 10, 1961

3,004,102
DATA-REPRODUCING APPARATUS
Nicholas Curtis, Denville, N.J., assignor to Trans-Lux Corporation, New York, N.Y., a corporation of Delaware
Filed Oct. 23, 1959, Ser. No. 848,254
6 Claims. (Cl. 178—7.1)

This invention relates to a structurally and functionally improved data-reproducing apparatus; the present application being a continuation-in-part of my earlier application Serial No. 778,972 filed on December 8, 1958, and now U.S. Patent 2,946,849, dated July 26, 1960.

It is a primary object of the invention to furnish an improved apparatus by means of which data appearing upon a number of strips may be reproduced at relatively remote locations. So reproduced, the indicia on the strips will be presented to viewers at those locations almost immediately after they are imprinted.

A further object is that of furnishing a mechanism for the simultaneous reproduction of data, which mechanism those strips will be disposed within and will pass through a scanning field with the strips being free from lines of fold, kinking, or entanglement of one strip with another. Thus a clear image will be presented to the viewer.

Still another object is that of providing an apparatus in which servicing problems will be reduced to a minimum and without disarrangement of the compounds of the apparatus occurring as a consequence of such servicing.

Figure 7:
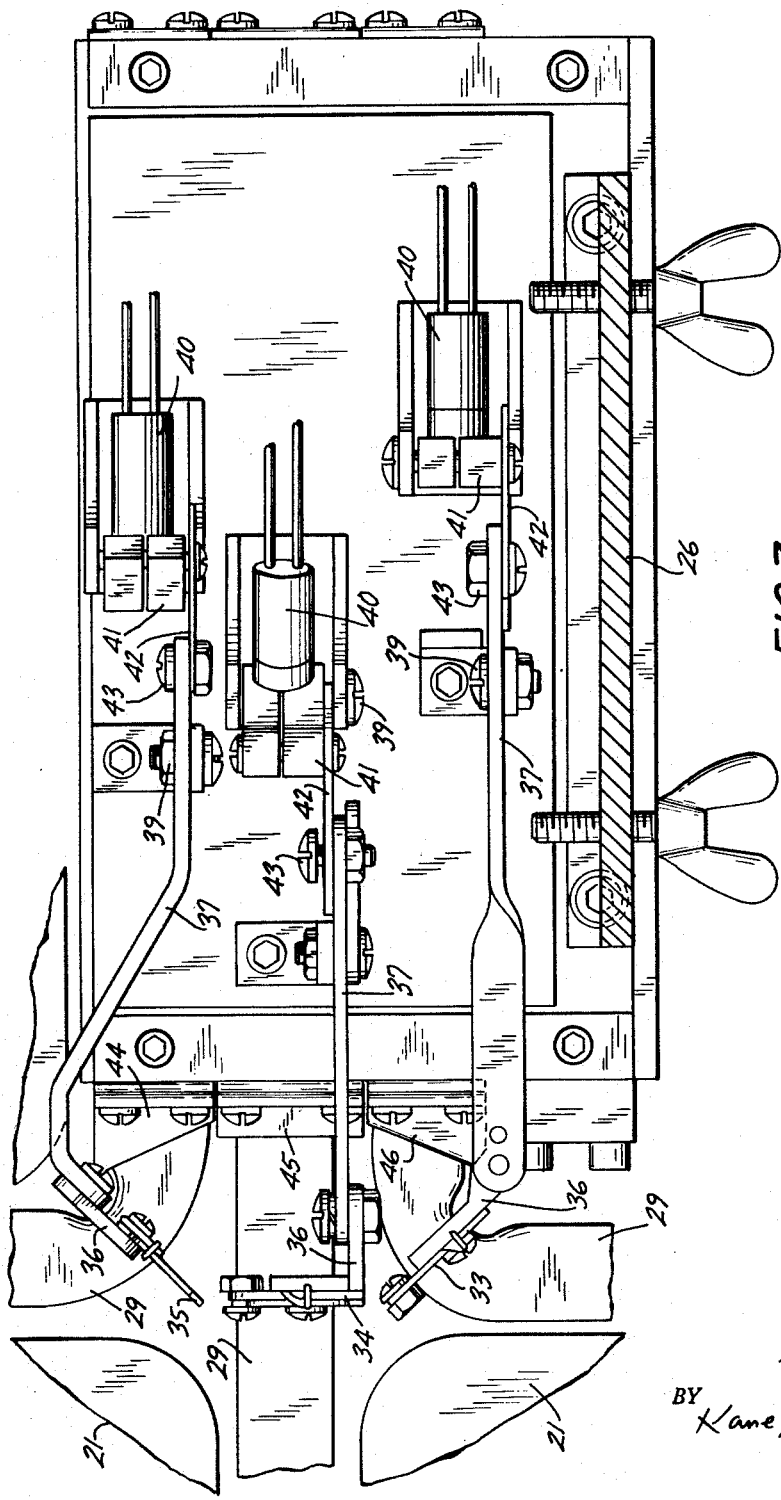
Figure 8:
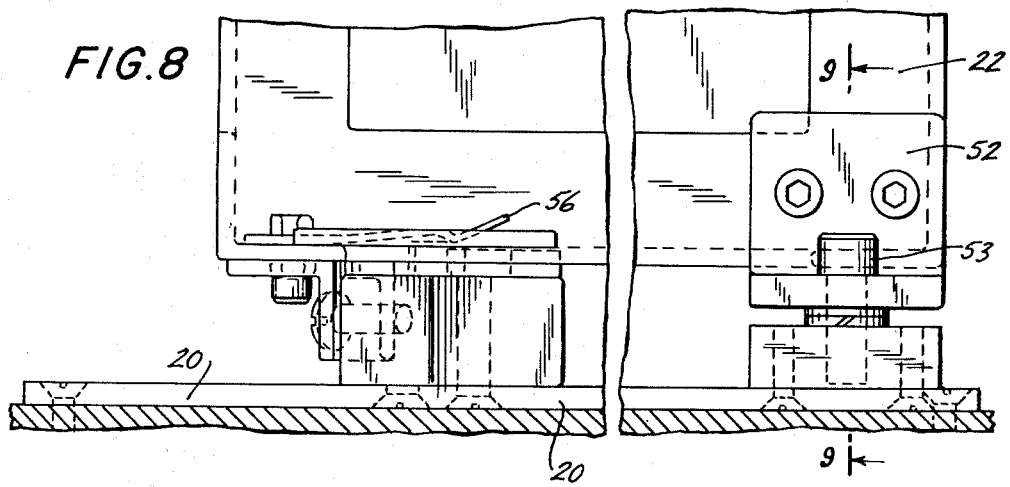
Figure 10:
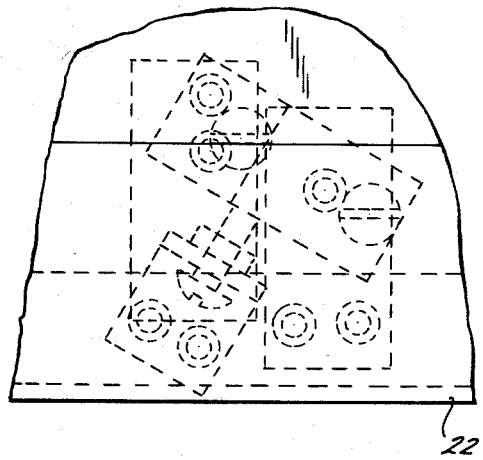
Figure 9:
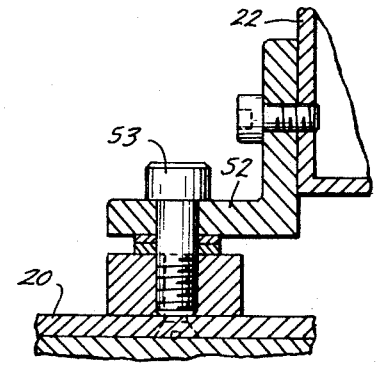
Figure 11:
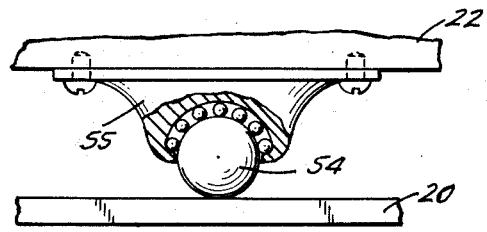

With these and other objects in mind, reference is had to the attached sheets of drawings illustrating one practical embodiment of the invention, and in which:

FIG. 1 is a side elevation of the apparatus;
FIG. 2 is a partialy sectional plan view taken along the line 2—2 in the direction of the arrows as indicated in FIG. 1;
FIG. 3 shows the deck member providing the scanning station, together with the elements associated with that member;
FIGS. 4, 5 and 6 are transverse views taken respectively along the lines 4—4, 5—5 and 6—6 in the direction of the arrows as indicated in FIG. 3;
FIG. 7 is a bottom plan view of the structure as shown in FIG. 3;
FIG. 8 is a fragmentary, partly sectional side view of the base portion of one of the cabinets embracing the indicia-printing assemblies;
FIG. 9 is a transverse sectional view taken along the line 9—9 in the direction of the arrows as indicated in FIG. 8;
FIG. 10 is a fragmentary plan view of a detail of the structure as shown in FIG. 8; and
FIG. 11 shows a preferred form of supporting member for one of the supporting assemblies.

Referring primarily to FIGS. 1 and 2, the numeral 20 indicates a supporting member, which may be in the nature of a table top. Disposed upon that member are a number of imprinting assemblies, such as ticker tape mechanisms, each conveniently including cabinet and base portions, as generally indicated at 21 and 22 respectively. A support member 23 extends vertically above the table and adjustably mounts a camera 24 of the television type so that the axis of its lens extends perpendicular to a deck member.

Adjacent mounting 23 the table 20 or other supporting member has secured to it a bracket 25, as especially shown in FIG. 3. This bracket, by means of an adjustable supporting assembly 26, serves to mount a deck member 27 adjacent the assemblies 21, within the field of camera 24. The surface of deck member 27 is illuminated by, for example, fluorescent tubes 28. Accordingly, data-carrying strips passing over deck member 27 will be scanned by camera 24. That camera is connected with a number of remotely disposed receivers of the television type. Such connections may be established by closed circuits or otherwise.

Each of the mechanisms within cabinets 21 will be of the ticker-tape type. As such, they will imprint upon the strips 29 of paper or other suitable material, indicia providing, for example, market quotations of stocks and commodities. The strips are delivered by the apparatus assemblies, pass across the deck surface 27 and are conveniently stored upon receiving reels 30. To effect movement of the strips across the deck surface defining the scanning field of the camera, assemblies of strip-feeding rollers 31 are provided. Reels 30 are caused to rotate by means of motors 32, which may also serve to rotate roller assemblies 31. Otherwise, those assemblies may be driven by separate motors. In either event, the ends of the strips are threaded through assemblies 31 and then into the receiving portions of adjacent reels. If it is not desired to store the tape, then it may feed in any convenient manner from the rollers which draw it across the deck surface and be distributed as desired.

By means of the present apparatus, indicia imprinted on the strips will be quickly disposed within the field of the camera upon the deck surface. This result is hightly desirable, in that a viewer at a relatively remote location should have the data provided by the indicia upon the strips before him as soon as possible after the imprinting mechanism has applied these data to the strips. It is for this reason that, as particularly shown in FIG. 2, the several printing assemblies are disposed immediately adjacent each other and the deck member, so that their strip-delivering mechanisms will be immediately adjacent that member and in positions at which the strips converge toward the deck surface. In their passage over the deck surface the strips should be disposed parallel to each other. In their approach to that surface, they will extend at angles with respect to each other. To avoid difficulties of kinking or of entangling of one strip with another, the strips should follow curved paths to the deck surface.

To accomplish this result, guide structures intervene the deck surface and the printing assemblies. These structures have been best shown in FIGS. 3 to 7 inclusive, in which the numerals 33, 34 and 35 indicate members of inverted U-shape, between the arms of which the different strips discharged by the three printing assemblies pass. Each of these guides is supported upon a link 36, which in turn connects to a lever 37. The coupling between these parts is susceptible to adjustment, so that the guides may have their positions accurately related to the direction of movement of the individual tapes which are associated with them. A guide element 38 in the nature of a projection capable of being caused to assume angular positions is affixed to each of the members 33 to 35 and conveniently extends from the base of the latter in a downward direction at a point midway between its arms. Each of the levers 37 is pivotally mounted, as at 39, adjacent the underside of deck 27. Switches 40, individual to each of the levers, are also mounted adjacent the underside of deck 27, preferably by being secured to plates or links 41, which are pivotally coupled to connecting members 42. The latter, by means of pin-and-slot connections 43, are operatively associated with the rear ends of levers 37.

These switches connect one with each of the motors serving to draw strips or tapes across the deck by means of the rollers 31. The switches are of the type which when inclined, as shown in FIGS. 4 to 6, will close the circuits through the motors 32. Therefore, when members 33–35 are in depressed positions those motors will operate to cause tape to be drawn across the deck.

At the forward end of the deck, guide members 44, 45 and 46 are mounted. All of these present rounded forward edge portions. The first has its edge inclined toward the center of the deck. The second, as shown in FIG. 7, has its edge parallel with the front face of that deck. Member 46 has its forward edge inclined toward the center line of the deck and opposed to the direction of inclination of the edge of member 44. Guides conveniently in the form of pins 47 extend above the upper surfaces of members 44–46. A support 48, as shown in FIG. 3, is in turn disposed above these members and mounts assemblies 49, one in line with each of the zones of tape passage across the deck, and terminating in lower strip-contacting elements 50, which, as shown, are preferably rounded. These elements bear against the upper surfaces of the tapes or strips as the latter pass over members 44–46. A plate 51 having a rounded upper edge may be interposed between these members and the surface of deck 27.

By this arrangement of parts it is feasible to have the surface of an imprinted tape pass immediately to the scanning station as defined by deck 27, rather than have it travel through a substantial distance before reaching that station. In this connection it will be noted, as in FIG. 2, that the several tapes are discharged by the different imprinting assemblies 21 at points immediately adjacent each other. With such discharge, however, only the tape passing through the central guide 34 and over the adjacent member 45 will follow a straight path. The other two tapes will move in toward the front end of the deck from opposite directions and at right angles with respect to the first tape. It is essential that as these tapes move onto the deck and across the same in directions parallel to the first tape, no kinking or wrinkling of their bodies will occur as they change their direction of movement. This is readily achieved by disposing guide members 33 and 35 at angles of around 45° with respect to guide member 34; this disposition being illustrated in FIG. 7.

Moreover, elements 38 associated with members 33 and 35 will engage the upper tape surface in its movement and serve to maintain it in each instance in positions where its side edges and body are properly disposed with respect to the arms forming parts of those members 33 and 35. In the case of the guide element associated with the central member 34, no diverting or deflecting of the central tape occurs, in that it is moving in a straight line. The tapes will now move over the forward edges of guides 44, 45 and 46. The angularity of those edges is accurately related to the paths of movement of the tapes as they travel through guide members 33 and 35. Therefore, the tapes will move over the upper edge of plate 51 or its equivalent and thence in parallel relationship over the deck surface 27.

The contact elements 50 assure that the tape will be pressed against the surface of a given guide member 44 to 46 to flatten it. Due to the convexity of the contact faces of these elements, no smudging of the ink upon the tape or strip will occur. The same will be true of the contact between the surfaces of the tapes and the guide elements 38. Therefore, difficulties in this connection will be avoided. It will be observed that the assemblies involving guide members 33 to 35 and the switches 40 provide for a normal tendency of those guide members to assume a lower position. That position will be maintained while the tapes extend in the form of downwardly bowed loops between the imprinting and delivering apparatus 21 and the guide members. As afore brought out, under these conditions the circuits to the several motors 32 will be closed to cause those motors to operate. Therefore, the tapes will be drawn at maximum speed across the field of television camera 24, as defined by the deck. When, however, the imprinting and delivering apparatus 21 in any instance discharges tape at a slower rate of speed than that at which the tape is drawn up by the roller assembly 31, the loop will flatten. With such flattening, the particular guide member involved in the series 33 to 35 will be elevated. As it elevates, lever 37 will be rocked to shift the position of the corresponding switch 40 to a point where the latter interrupts the motor circuit. Under these circumstances, the connected pair of rollers 31 will cease to function. As soon as the imprinting apparatus delivers or discharges a sufficient amount of tape to again form a loop in the latter, the particular guide member will drop and the circuit will be reestablished, so that tape will be drawn to be received upon reel 30 or otherwise disposed of.

Now, with a view to rendering each of the imprinting mechanisms 21 accessible for servicing without it being necessary to dismount parts of the apparatus, attention is next invited to FIGS. 8 to 10, in which it will be seen that studs or bolts 53 are secured against movement with respect to the deck surface 20 and extend upwardly therefrom to define pivot points. Brackets 52 have their lower arms rotatably encircling these bolts. Their upper arms are secured against movement with respect to the cabinet or base portions 22. Mounted by the lower faces of the casings or base portions 22 are anti-friction supports. These may conveniently embrace, as illustrated in FIG. 11, spherical members extending into the sockets defined by plates 55. A suitable number of these supports extend between each casing and the deck surface. It is obvious that by means of them, the cabinets may readily be swung around their pivots 53 so as to be freely accessible, as indicated in broken lines in FIG. 2. Where such swinging is resorted to, an excess of tape will be drawn to extend between an imprinting mechanism and the adjacent guide structure. Accordingly, it will not be necessary to sever the tape for servicing purposes. The excess tape will simply be drawn up by the driving rollers 31 as soon as the circuits are energized. When returned to a normal position, the imprinting apparatus may be maintained, as shown in full lines in FIG. 2, by a suitable latch structure, as generally indicated at 56 in FIG. 8. When it is again desired to service the mechanism, the latch structure may be manually released without effort.

Thus, among others, the several objects of the invention as specifically aforenoted are achieved. Obviously, numerous changes in construction and rearrangements of the parts may be resorted to without departing from the spirit of the invention as defined by the claims.

I claim:

1. In an apparatus of the character described, a pair of tape-printing and feeding mechanisms each having a zone from which imprinted tape is discharged, tape-supporting means providing a display station therefor, means mounting said mechanisms to normally maintain them in positions at which the tapes discharged thereby move toward each other, a television camera, means for supporting such camera to encompass within its field tapes displayed at such station, means interposed between said tape-supporting means and the discharge zones of said mechanisms for guiding the tape in movements converging upon the display station and causing them to traverse the surface thereof in parallel relationship, means individual to each tape for drawing the same across such display station and said mechanisms being supported for movements to positions relatively remote from said display station whereby the mechanisms are individually rendered accessible for servicing.

2. In an apparatus as defined in claim 1, pivots included the supports of said mechanisms whereby the latter may be swung to positions adjacent and remote from said display station.

3. In an apparatus as defined in claim 2, latch means providing parts cooperating to normally maintain said mechanisms adjacent said display station.

4. In an apparatus as defined in claim 2, mounting means extending below said mechanisms and antifrictionally engaging a supporting surface as said mechanisms are shifted from one position to another.

5. In an apparatus as defined in claim 1, the means individual to each tape for drawing the same comprising a motor-driven mechanism, means for movably mounting said guiding means, a plurality of pivotally mounted interconnected members coupled to said guiding means and a switch movable to operate a motor of said driving means coupled to said members.

6. In an apparatus as defined in claim 5, each of said guiding means comprising an inverted U-shaped member the legs of which straddle a tape to guide it in a curved path in its movement toward said display station and a plate providing a guiding lip disposed in advance of said station, which lip is disposed at an angle corresponding to the direction of approach of a tape thereover toward that station.

References Cited in the file of this patent
UNITED STATES PATENTS

| | | |
|---|---|---|
| 2,726,289 | Evans | Dec. 6, 1955 |
| 2,914,752 | MacDonald | Nov. 24, 1959 |